United States Patent Office 3,393,045
Patented July 16, 1968

3,393,045
PROCESS FOR THE PREPARATION OF A
CRYSTALLINE ZEOLITE
Philip K. Maher, Baltimore, Md., assignor to W. R. Grace
& Co., New York, N.Y., a corporation of Connecticut
No Drawing. Filed Dec. 3, 1964, Ser. No. 415,810
5 Claims. (Cl. 23—112)

ABSTRACT OF THE DISCLOSURE

A method of preparing crystalline aluminosilicate zeolites in which the silica-alumina content of the zeolite is provided by acid treating kaolin-type clays. The method is particularly distinguished by avoiding the necessity of calcining the clay.

This invention relates to a process for preparing microselective adsorbents. In one specific aspect, it relates to a novel process for the preparation of a synthetic crystalline zeolite having an effective pore size of about 13 Angstrom units and a silica-to-alumina ratio of 2.5±to 0.5.

Microselective adsorbents of the zeolite group are crystalline metal alumino-silicates with a three dimensional network structure of silica and alumina tetrahedra. This zeolite structure is characterized by a repeating three-dimensional network of large open alumino-silicate cages interconnected by smaller uniform openings or pores. Certain of these microselective adsorbents have been prepared synthetically from sodium silicate and sodium aluminate. After synthesis, these large cavities are filled with water which can be driven off by heating without collapsing the cage. When dehydrated, these cavities can readsorb large quantities of water or other vapors at low partial pressures. Due to the small uniform strictures or pore openings connecting the alumino-silicate cavities, these zeolites exhibit the unique property of excluding larger molecules from the cavity and allowing smaller molecules to pass through and be adsorbed, thereby acting as microselective adsorbents for molecules according to their size and shape. The adsorbents of the present invention have an effective pore size of about 13 Angstrom units and are of interest for use in adsorbing large molecules and storing them for later release. Thus, these microselective adsorbents will adsorb molecules of critical size below about 10 to 14 Angstrom units. These materials can thus function as carriers for a wide variety of chemical compounds. When the chemical compound is needed, it is released by heating the carrier or by displacement of the chemical with another adsorbate such as water.

These materials have other uses which have recently become of great importance; use as components in certain types of catalysts. Cracking catalysts can be prepared which contain promotional amounts of these zeolites in the cracking catalyst matrix.

We have discovered a new process for the preparation of a synthetic crystalline zeolite having an effective pore size of about 13 Angstrom units, a silica-to-alumina ratio of 2.5±to 0.5, hereinafter referred to Z–14 Na zeolite, in which the Na indicates that the exchangeable cation associated with the alumino-silicate is the sodium ion. The Z–14 zeolites of this invention are the same as the zeolites designated by Union Carbide Corporation as type X molecular sieves.

In the preparation of these zeolites it is necessary to increase the silica-to-alumina ratio above the ratio normally found in kaolinitic clays. In application Ser. No. 850,757, filed Nov. 4, 1959, now abandoned, a process is disclosed in which clay is calcined and treated with sodium hydroxide and hydrous silica or sodium silicate at room temperature. The mixture is then heated to form the zeolite, and the resulting crystalline zeolite is separated from the solution. This process yields a very pure Z–14 Na zeolite.

In the processes for preparing the zeolite from clay, it is necessary to alter the clay structure to make it more reactive, so that the reaction of the clay with the sodium hydroxide progresses satisfactorily. It is also necessary to increase the silica-to-alumina ratio by the addition of an extraneous source of silica, such as sodium silicate, hydrous silica, silica sol, etc. In the process disclosed in application Ser. No. 850,757 the alteration of the structure of the kaolin is achieved by calcination, and the excess silica is added as a sodium silicate.

We have discovered a new versatile process for the preparation of Z–14 Na zeolite which avoids the necessity for calcination of the clay and also for the addition of excess silica to increase the silica-to-alumina ratio in the reactants. Calcined clays can be employed but are not preferred because of the higher cost. In essence, our novel process consists of treating a suitable clay with acid to solubilize a portion of the alumina, washing the acid treated clay, and converting the clay to the zeolite using sodium hydroxide or some other caustic material in a hydrothermal conversion step.

It is therefore an object of this invention to provide a method for the preparation of Z–14 Na zeolite and other Z–14 type zeolites from readily available and inexpensive starting materials by a process which eliminates the need for calcination and the addition of excess silica from extraneous sources.

The primary raw material for my process is kaolin, a commercially available clay. Either the calcined or uncalcined form can be employed, but the latter is preferred. Other closely related clays such as halloysite are also suitable starting materials in my process. In the first step of the process, the raw or calcined clay is treated with a solution of a strong mineral acid. Hydrochloric, sulphuric and nitric acids give satisfactory results. Because of the ease of removing residual acid and because of cost consideration, sulphuric acid is a preferred reactant.

The clay is treated with an acid solution in a concentration of from 1 to 80 wt. percent preferably about 40 percent. The clay is treated with that amount of acid which will solubilize and remove about 20 to 55 percent of the original alumina content of the clay. This treatment can be carried out by simply stirring the clay with the proper amount of the acid in proper concentrations. However, the rate of the reaction is increased if the slurry of clay and acid is heated slightly. After this treatment is complete, the clay is filtered to remove the dissolved alumina, and preferably washed with water to remove any residual acid. Washing is unnecessary since unwashed clay merely requires additional caustic to neutralize the residual acid. The clay is then dried and is ready for the subsequent steps of the process.

In the next step of the process, the acid-treated clay residue is treated with the proper quantity of sodium hydroxide and water. The slurry of sodium hydroxide and acid treated clay is aged at room temperature for at least 3 hours. The operable and preferred range of ratios of reactants are as follows:

| Reactants | Operable Range | Preferred |
|---|---|---|
| Mole ratio of $Na_2O$ to $Al_2O_3$ | 1.5-5 | 2.5-4 |
| Mole ratio of $SiO_2$ to $Al_2O_3$ | 3-5 | 3-5 |
| Mole ratio of $H_2O$ to $Al_2O_3$ | 50-200 | 120-200 |

It is critically important that the reactant conditions set out above be followed. If the amount of sodium oxide present or the concentration of sodium oxide is too low in the aging and hydrothermal conversion steps, the conversion to zeolite will proceed slowly and will not go to completion. That is, unconverted clay will be present with the zeolite formed. Furthermore, if the amount of sodium oxide present or the concentration of sodium oxide used is too high, other undesirable zeolites will be produced contaminating the Z-14 Na zeolite that is formed. The contaminating zeolites are of limited usefulness in that they do not have the desirable adsorbent and other properties of the pure zeolite. In addition, these materials have limited usefulness in the preparation of the catalyst.

Two other factors of importance are both the aging step and the hydrothermal conversion step. These two factors depend on closely related variables, time and temperature. The aging process is operable at temperatures in the range of from about 20 to 40° C., but the lowest convenient temperature of operation is room temperature, about 25° C.

The hydrothermal conversion process is operable at temperatures of from about 50° C. to 120° C. The most convenient conversion temperature is near the boiling point of the solution or from about 90 to 110° C. Undesirable, contaminating zeolites are formed at conversion temperatures above 120° C. At temperatures below 50° C., hydrothermal conversion is believed to take place, but the conversion requires very long periods of time. The rate of conversion to the zeolite in the hydrothermal conversion step is a function of the temperature employed. At a temperature of 120° C., less than one hour is required, 30 minutes being a minimum period of time. At temperatures within the preferred range of from 90 to 110° C., a heating time of one hour is required, and heating for 8 hours is adequate under essentially all circircumstances at these temperatures. Heating for longer than 8 hours at the preferred temperatures will not harm the product, but no further advantage is obtained. At temperatures below 90° C., the conversion to Z-14 Na zeolite proceeds more slowly. At a temperature of 50° C., conversion requires about 15 days. Temperatures above about 60° C. are necessary in order to avoid the protracted conversion times.

The aging time is dependent upon the temperature, and the best conversion of the Z-14 Na zeolite is obtained when the clay has been aged at about 25° C. for a protracted period of time, such as from 48 to 72 hours.

The remaining steps of our process present no special difficulties. The crystalline zeolite is removed from the reaction mixture by conventional means, that is by filtering, decantation or centrifugation followed by washing with water. The wet zeolite is activated and converted to the adsorbent form by driving off the water, for example, by heating the zeolite to about 350° C. for about 2 hours. This activation treatment drives off the water contained in the pores of the zeolite and thus gives the zeolite the capacity to readsorb water or other vapors at low partial pressures. If desired, the wet Z-14 Na zeolite may be converted to the calcium zeolite Z-14 Ca, ammonium zeolite, other alkali or alkaline earth cation forms, rare earth forms, etc., by treating with an aqueous solution containing the appropriate cation using standard base-exchange techniques. Here the exchange cation replaces the sodium ions and changes the adsorption and other properties of the zeolite.

The synthetic crystalline zeolite obtained by our process has the approximate molecular formula:

$$Na_2O:Al_2O_3:2.5SiO_2:nH_2O$$

where $n$ is a small number.

When the details of my process are carefully carried out, there is obtained a crystalline zeolite adsorbent having uniformly sized apertures. The steps of the process are very important. Insufficient aging of the acid-treated kaolin with sodium hydroxide solution or treatment without aging will result in an unsatisfactory Z-14 zeolite. The contaminated product usually contains sodalite, or other zeolites characterized by a more compact structure than the Z-14 zeolites. The presence of such contaminants in the zeolite to be used as an adsorbent will decrease the capacity of adsorption and hence the desirability of the resultant adsorbent. Thus, if the steps of our process are not followed carefully, the properties of the finished adsorbent will be impaired because of the presence of other undesirable zeolites. The same zeolite contaminant is obtained when the clay is not aged properly or when the concentration of sodium hydroxide or the ratio of sodium oxide to calcined kaolin used in the hydrothermal alteration step is incorrect. Strict adherence to the conditions of our process is necessary in order to continually produce a satisfactory Z-14 Na zeolite product.

The gross chemical analysis and apparent density of the crystal are not sufficient measures of the crystal structure characteristic of microselective adsorbents. The zeolite structures may be distinguished from one another by certain of their physical properties, the most characteristic of which is their X-ray diffraction patterns. After conversion to the Z-14 Na adsorbent, for example, the X-ray diffraction pattern of the zeolite is truly its most unique characteristic capable of routine measurement. This follows from the fact that both the unique attributes of the zeolite and its X-ray diffraction pattern are functions of the intimate arrangement of the atoms in the crystal lattices. Not only can Z-14 Na zeolite be identified by its X-ray pattern but the presence of crystalline impurities can be readily distinguished at the same time by the appearance of foreign diffraction lines in the pattern. These crystalline impurities have their own unique patterns and the characteristic lines of the usual contaminants, such as undesirable zeolite or kaolin, can be readily identified.

The scope and utility of my invention is further illustrated by the following examples.

Example I

A total of 200 grams of metakaolin was mixed with 36.7 grams of 30% sulfuric acid. The mixture was heated at 110° C. for a period of two hours. At the end of this time, the slurry was filtered and the residue washed with 1 liter of water and 1 liter of 1% ammonium carbonate solution. The product was then dried at 110° C. overnight. The analysis of the acid treated clay was as follows:

Total volatiles _____ 18.98
$SiO_2$ _____ 63.26
$Al_2O_3$ _____ 36.78
Silica to alumina ratio _____ 2.85

40 grams of this material (20.5 grams $SiO_2$, 11.9 $Al_2O_3$, and 7.6 grams of water) were mixed with 28 grams of NaOH (21.8 grams $Na_2O$). The $Na_2O$ to $Al_2O_3$ ratio was thus 3. The $Na_2O$ solution was added as 1.2 mole $Na_2O$. A total of 279 grams of water was added. The mixture was stirred at room temperature for a period of 48 hours and refluxed for 10 hours at 100° C. The product was filtered, washed in 500 cc. of water, and dried at 100° C. overnight. A sample of the dried product was submitted for analysis. The results in weight percent were as follows:

| | |
|---|---|
| Total volatiles | 11.98 |
| $SiO_2$ | 49.03 |
| $Al_2O_3$ | 30.12 |
| $Na_2O$ | 17.83 |

The product displayed the following X-ray diffraction lines:

| $d$ ($A_0$): | $I/I_0$ |
|---|---|
| 14.6 | 100 |
| 8.9 | 34 |
| 7.56 | 22 |
| 5.75 | 40 |
| 8.81 | 12 |
| 4.41 | 20 |
| 3.95 | 10 |
| 3.81 | 48 |
| 3.34 | 46 |
| 3.05 | 11 |
| 2.947 | 19 |
| 2.882 | 44 |
| 2.794 | 18 |
| 2.661 | 18 |

This X-ray diffraction pattern is characteristic of the pattern of Z-14 Na zeolite. This example shows the preparation of the Z-14 Na Zeolite under preferred conditions. Yields of 95% or better can be consistently achieved by operating under these conditons.

I claim:

1. A process for forming a synthetic crystalline aluminosilicate Z-14 zeolite comprising the steps of:
    (a) reacting uncalcined kaolin-type clay with an aqueous solution of a strong mineral acid containing sufficient acid to solubilize from about 20 to 55 wt. percent of the original alumina content of the clay,
    (b) separating the acid-treated uncalcined clay from the acid solution,
    (c) mixing the acid-treated uncalcined clay with water and sodium hydroxide in quantities sufficient to provide a reaction mixture having the following mole ratios expressed as oxides:

| | |
|---|---|
| $Na_2O/Al_2O_3$ | 1.5–5 |
| $SiO_2/Al_2O_3$ | 3–5 |
| $H_2O/Al_2O_3$ | 50–200 |

(d) aging the mixture at a temperature within the range of from 20 to 40° C. for at least 3 hours,
    (e) heating the aged mixture of from 50 to 120° C. until the crystalline aluminosilicate is formed, and
    (f) separating the crystalline aluminosilicate from the mother liquor.

2. The process of claim 1 wherein the clay is reacted with an aqueous solution having a mineral acid concentration within the range of from 1 to 80 weight percent.

3. The process of claim 1 wherein the acid-treated clay is separated from the acid solution by filtration and washed with water to remove residual acid.

4. The process of claim 1 wherein the reaction mixture has the following ratio of reactants, expressed as oxides:

| | |
|---|---|
| $Na_2O/Al_2O_3$ | 2.5–4 |
| $SiO_2/Al_2O_3$ | 3–5 |
| $H_2O/Al_2O_3$ | 120–200 |

5. The process of claim 1 wherein the aged mixture is treated at a temperature within the range of from 90 to 110° C. for at least one hour to form crystalline aluminosilicate.

References Cited
UNITED STATES PATENTS

| | | | |
|---|---|---|---|
| 3,065,054 | 11/1962 | Haden et al. | 23—112 |
| 3,094,383 | 6/1963 | Dzierzanowski et al. | 23—112 |
| 2,979,381 | 4/1961 | Gottstine et al. | 23—113 |
| 3,116,973 | 1/1964 | Haden | 252—450 X |
| 3,119,660 | 1/1964 | Howell et al. | 23—112 |
| 3,140,251 | 7/1964 | Plank et al. | 252—455 X |
| 3,213,038 | 10/1965 | Chomitz | 252—450 |

EDWARD J. MEROS, *Primary Examiner.*